July 5, 1955  M. N. WEBER  2,712,408
APPARATUS FOR GAUGING CONTENTS OF CONTAINERS
Filed Jan. 8, 1953  5 Sheets-Sheet 1

INVENTOR.
MILTON N. WEBER
BY
Barnes, Kisselle, Laughlin & Raisch
ATTORNEYS.

July 5, 1955   M. N. WEBER   2,712,408
APPARATUS FOR GAUGING CONTENTS OF CONTAINERS
Filed Jan. 8, 1953   5 Sheets-Sheet 4

INVENTOR.
MILTON N. WEBER
BY
ATTORNEYS

July 5, 1955  M. N. WEBER  2,712,408
APPARATUS FOR GAUGING CONTENTS OF CONTAINERS
Filed Jan. 8, 1953  5 Sheets-Sheet 5

INVENTOR.
MILTON N. WEBER
BY
Barnes, Kisselle, Laughlin & Raisch
ATTORNEYS.

United States Patent Office 2,712,408
Patented July 5, 1955

2,712,408

APPARATUS FOR GAUGING CONTENTS OF CONTAINERS

Milton N. Weber, Detroit, Mich., assignor of one-half to Herbert W. Link, Detroit, Mich.

Application January 8, 1953, Serial No. 330,193

20 Claims. (Cl. 226—95)

This invention relates to the art of filling containers with produce and it is concerned particularly with an apparatus for accurately filling the containers within close limits. The invention is directed particularly to the filling of containers with edible substance and for convenience, we shall henceforth refer to the filling of cans with foodstuffs although the invention may be employed for the purpose of filling containers of any kind with material of any kind.

Needless to say, many foods and juices of fruits and vegetables are marketed at the present time in the well-known tin can, and there is difficulty in meeting the rigid requirements that a can must contain a specified weight of the product therein.

The present invention aims to provide a mechanism for weighing the cans as they are moved along a production line, so to speak, wherein they are filled and later sealed. In accordance with the invention, a moving can is weighed after it has been filled with the product, and it is rejected if overfilled and rejected if underfilled. Moreover, if a sequence of cans following one another are rejected then the mechanism of this invention is such as to correct the operation of the filling mechanism.

A structure exemplifying the invention is shown in the accompanying drawings.

Figure 1:
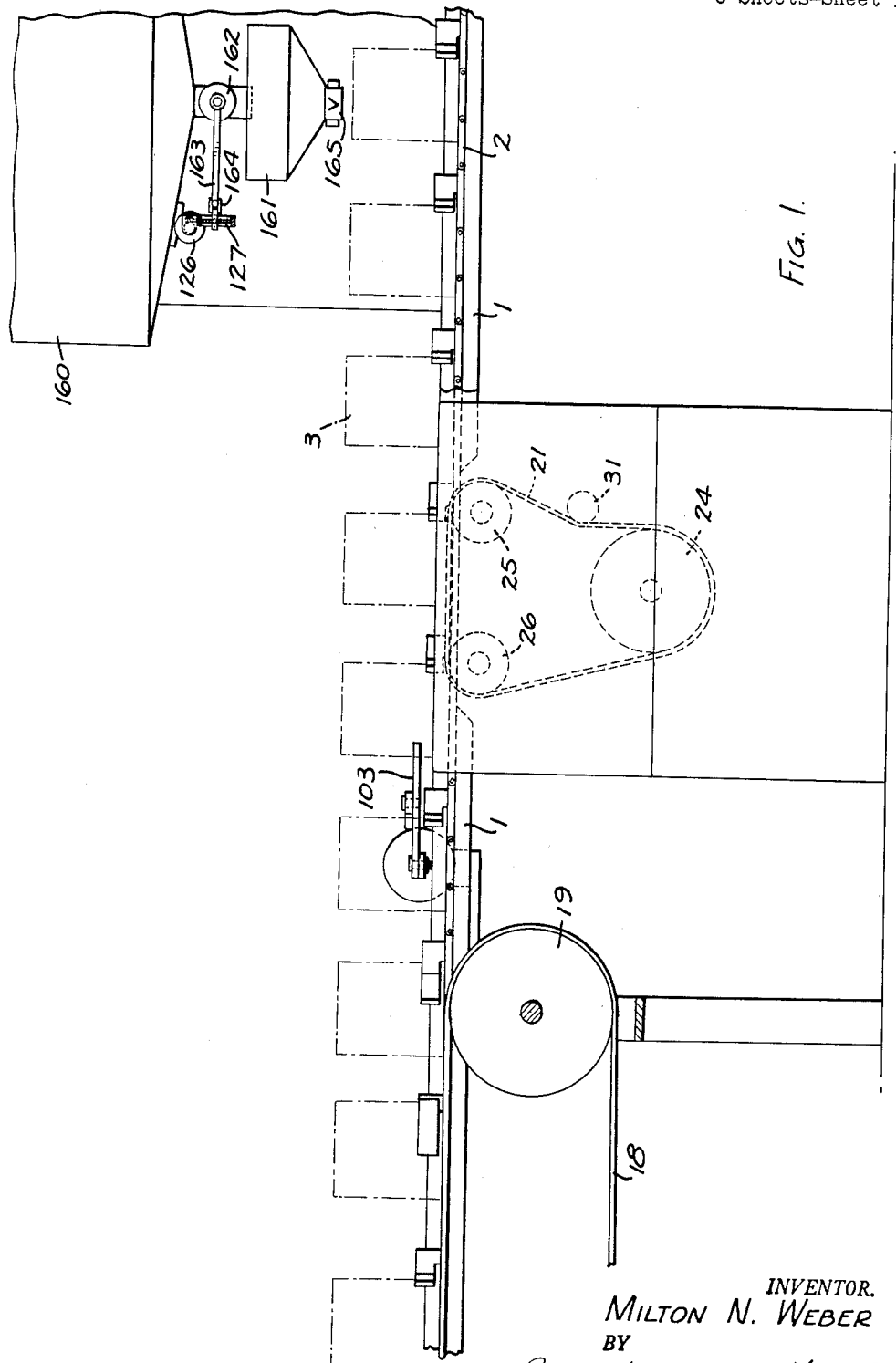
Fig. 1 is a side elevational view illustrating what may be termed a production line or portion thereof showing the progression of cans and illustrating the weighing mechanism.
Figure 2:
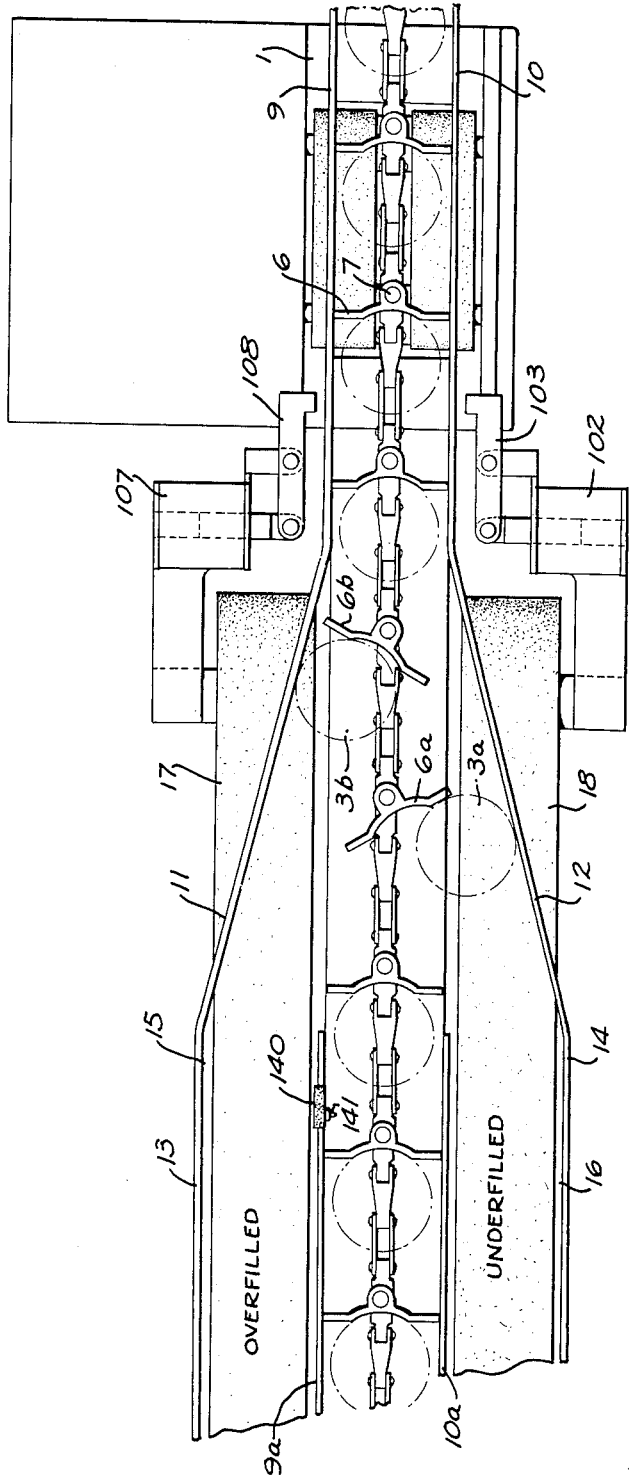
Fig. 2 is a top plan view of the structure shown in Fig. 1 illustrating how a can is rejected.

As shown in Fig. 1, a suitable support 1 is provided with a conveyor chain 2 which moves from right to left as Fig. 1 is viewed, and a succession of containers, conveniently termed cans, as shown at 3, are moved along the support by the conveyor chain. The chain is equipped with can pushing devices, as illustrated at 6, pivotally mounted on the chain as at 7. The conveyor support may be of trough form having side walls 9 and 10 between which the cans are moved. As shown in Fig. 2 the side rails 9 and 10 have portions which flare outwardly as at 11 and 12 and then have parallel portions 13 and 14. The side rails are thus divided and have downstream portions 9a and 10a. This provides a passage 15 located to one side of the conveyor chain and which opens into the area of the conveyor and a similar passage 16 on the opposite side thereof. Underlying the passages 15 and 16 are conveyor belts 17 and 18 which operate over pulleys, one of which is shown at 19 (Fig. 1).

Figure 3:
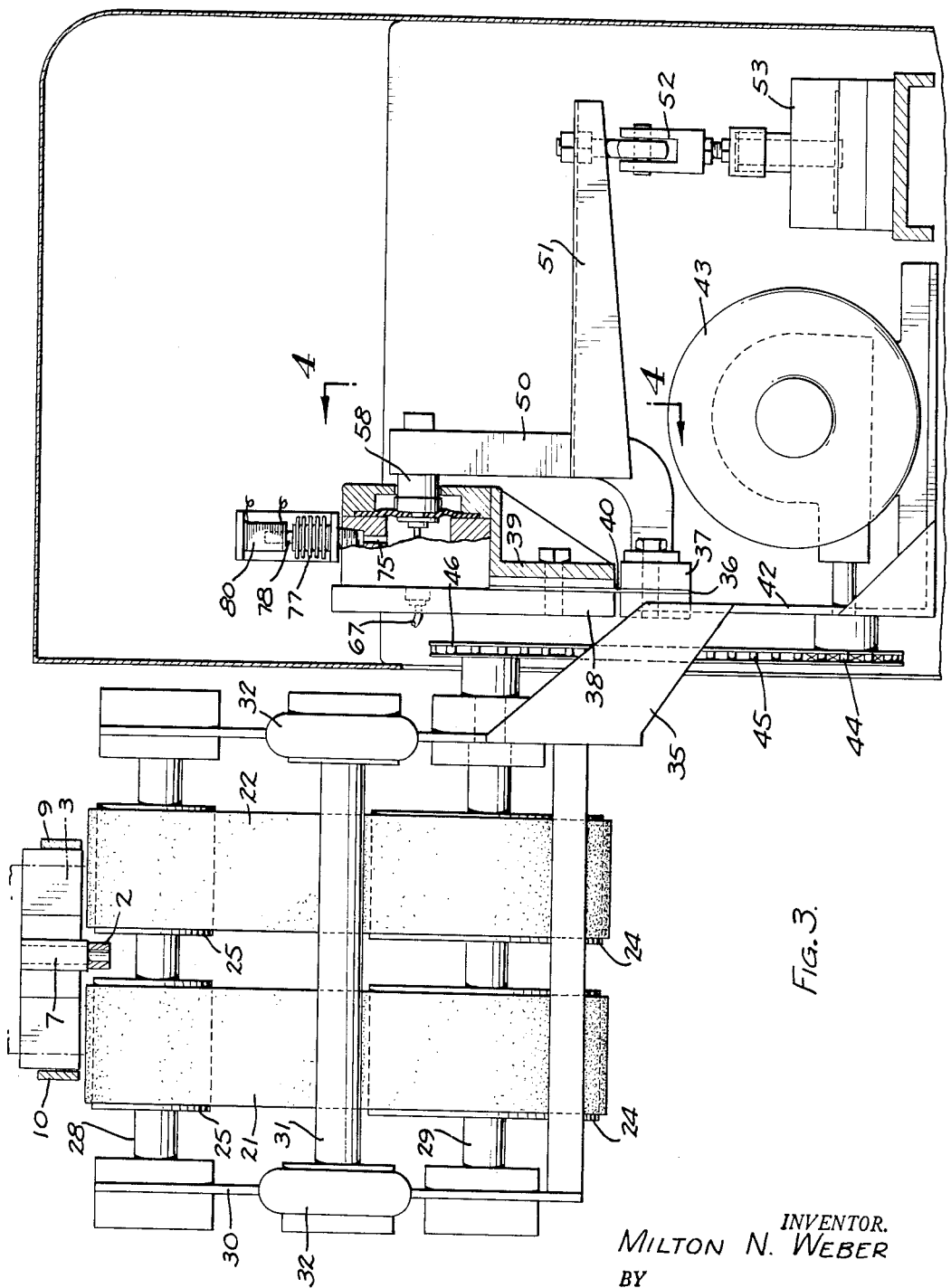
Fig. 3 is an enlarged view with some parts shown in section and illustrating the weighing mechanism.
Figure 4:
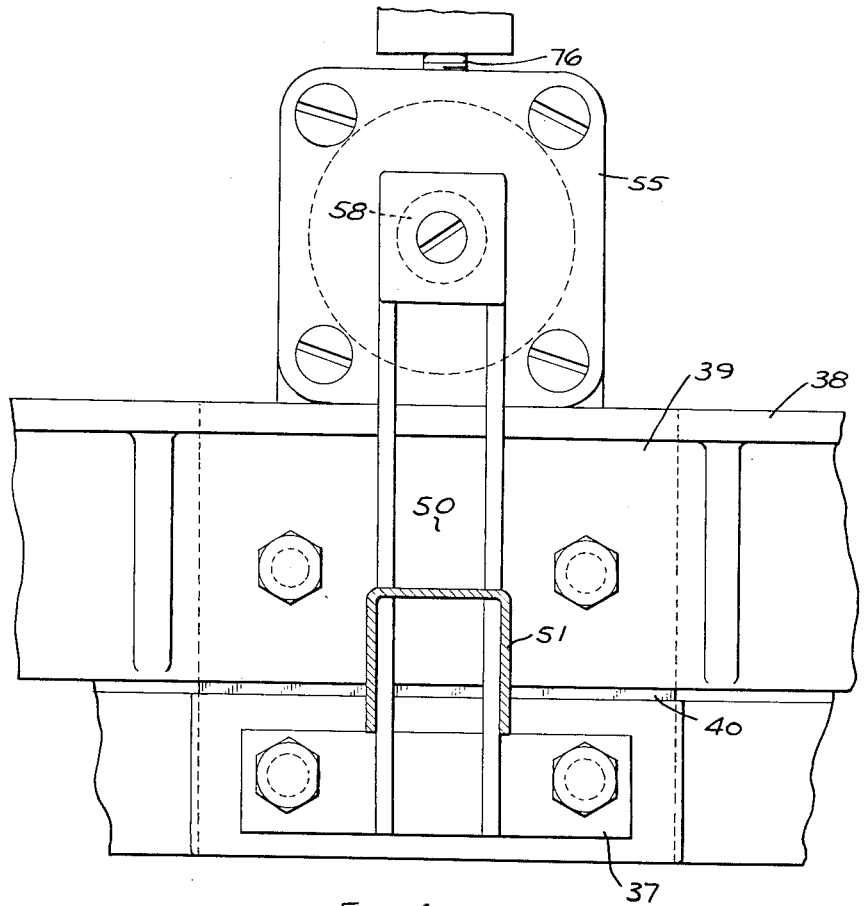
Fig. 4 is a view looking in the direction of the arrows 4—4 of Fig. 3 showing some of the structural parts and the balancing cylinder.

Positioned in line with the conveyor and preferably just upstream from the widening portions 11 and 12 is the weighing mechanism. The weighing mechanism has two belts 21 and 22 spaced from each other, as shown in Fig. 3, each operating over a lower pulley 24 and two upper pulleys 25 and 26. The pulleys are mounted upon shafts 28 and 29 carried at their ends in a frame 30. A tightener 31 is carried by the frame in bearings 32. The frame structure has a bracket 35 for supporting the same and the support is in the form of a thin flexible metal shim element 36 clamped to the bracket by a clamp 37 and clamped to a fixed carrying support 38 by a clamp member 39. A portion of the thin metal strip 36, which may be termed a fulcrum strip, is exposed as at 40 between its clamped ends, so that the weighing mechanism may have a slight pivotal movement.

A frame structure 42 is also carried by the bracket 35 and in the frame structure 42 is a motor 43 having a sprocket 44 over which operates a chain 45 for driving the pulleys 44 by operating over a sprocket 46. The conveyor chain 2 operates between the belts, as shown in Fig. 3. The belts are preferably operated slightly faster than the movement of the conveyor chain.

Considering Fig. 2 it will be appreciated that the chain moves from right to left and when a container comes into position to overlie the belts, the weight thereof is supported by the belts and thus its weight is transmitted to the fulcrum member 40 for causing rocking movement of the weighing assembly.

There is an arm 50 rigidly fixed to the frame 42 and another arm 51 connected by linkage generally shown at 52 to a dash pot 53 for controlling the slight movement. All this mechanism is carried by the frame structure of the weighing mechanism.

Figure 5:
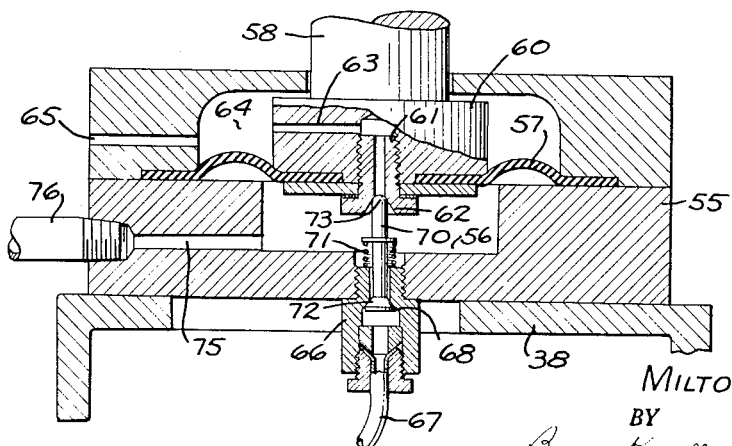
Fig. 5 is an enlarged cross sectional view taken through a compressed air weighing mechanism or balancing device.

Mounted in a fixed postion, as for example on the support 38, is a compressed air device, as shown in detail in Fig. 5. It has a body 55 with a chamber 56 defined by a diaphragm 57. This diaphragm is clamped to an actuating element or post 58 carried by the upper end of the L-shaped arm 50. The head of the post 58, as shown at 60, is provided with a hollow valve member 61 with a valve seat 62, an exhaust passage 63 leading to chamber 64 and the valve body has an exhaust port 65. The body 55 has affixed thereto a fitting 66 for receiving a tubing 67 for supplying air under pressure. The fitting has a valve seat 68. A valve member 70 acted upon by a spring 71, has a valve head 72 for cooperation with the seat 68 and a valving end 73 for cooperation with the seat 62. A passage 75 has a connection 76 for transmitting air under pressure into a bellows 77, or other similar or equivalent or expandable or contractable chamber. Secured to the bellows is an armature or core 78 shiftable in a coil 80.

At this point it may be well to say that as the containers are moved from right to left, as Fig. 2 is viewed, the weight thereof comes upon the belts and thus the weight is carried by the entire weighing unit suspended by the shim 36 and variations in the weight rocks the mechanism. This causes the actuator 58 to shift from left to right, depending upon whether the load is light or heavy. A heavy load swings the assembly counterclockwise as Fig. 3 is viewed and the diaphragm is pushed downwardly as Fig. 5 is viewed, thus opening the valve 72 allowing compressed air to enter the chamber 62 to react against the diaphragm 57. Thus, air pressure is admitted to the chamber 56 for balancing the heavier load. If the load on the weighing mechanism is light, the assembly shifts clockwise and the actuator 58 moves upwardly as Fig. 5 is viewed, thus opening the valve 73 so that air in the chamber 56 is exhausted to the point where the load is balanced. Thus the pressure in the chamber 56 balances the load; the pressure is increased in the chamber 56 by admission of air under pressure by heavier load and is exhausted by lighter load and this difference in air pressure shifts the core 78 in the coil 80. The movement is extremely slight and, furthermore, the weighing unit maintains a substantially constant position. This is because as soon as the unit is depressed by a load thereon, air enters the chamber 56 and brings the unit back to its normal position. If the unit moves upwardly under light load air is discharged from the chamber 56 and the unit returns to its normal position.

Figures 6, 7:
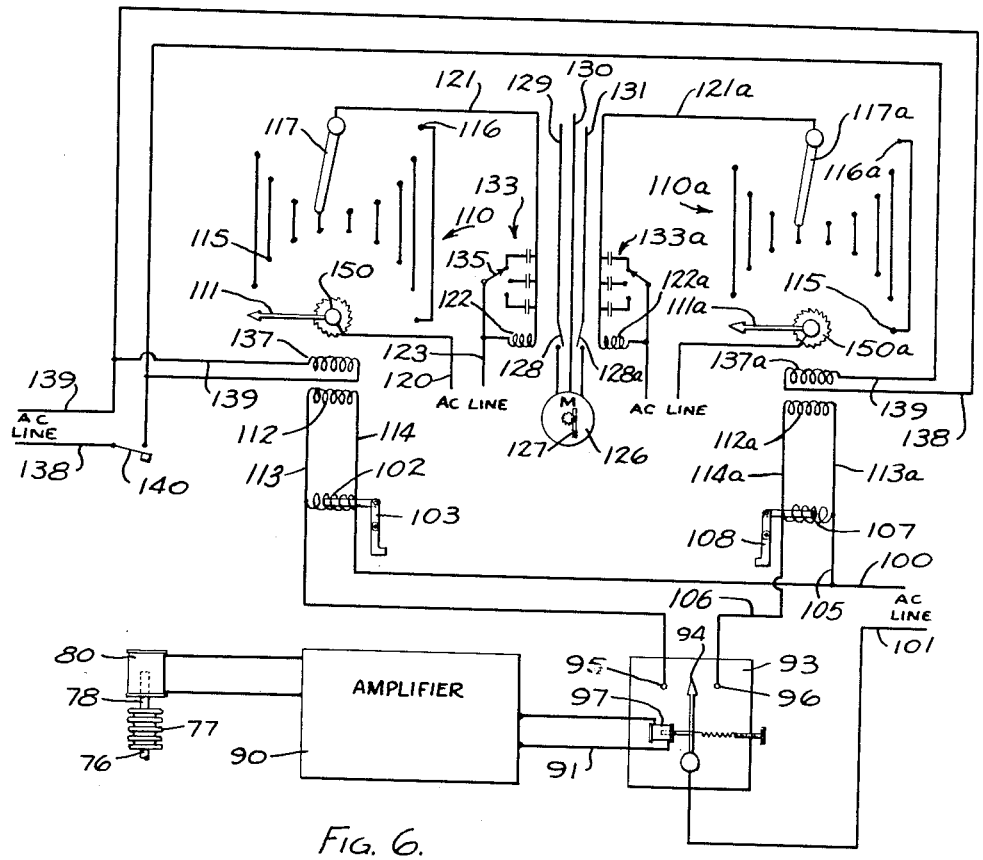
Fig. 6 is a view illustrating the wiring diagram and diagrammatically illustrating some of the mechanism.
Fig. 7 is a detailed view, illustrating somewhat schematically the stepping relay construction.

The electrical control system, as illustrated in Fig. 6, includes an amplifier 90 for amplifying the small variations in the current caused by the influence of the core in coil 80, and conductors 91 extend to a normally open switch element 93 with a shiftable arm 94 and contact points 95 and 96. The movable element is influenced by a solenoid 97. Variation of the current for light load causes the element 94 to shift into contact with 95. Variation incident to heavy load causes the arm 94 to contact with 96. Conductors 100 and 101 from a suitable source, extend to a coil or solenoid 102 for actuating a reject finger 103. As shown in Figs. 1 and 2, this reject finger is in the form of a pivoted lever positioned just downstream from the weighing unit adjacent one side of the conveyor line. One of the power lines extends through the switch 93 as shown. Lines 105 and 106 also extend to an actuating coil 107 of a reject finger 108 which, as shown in Fig. 3, is on the opposite side of the conveyor. A stepping relay generally shown at 110 has a movable contact member 111 actuated by a coil 112 connected in parallel with the coil 102 by conductor lines 113 and 114. The stepping relay includes a plurality of contacts 115 for contact with the arm 111 and a plurality of contracts 116 for contact with the manually adjustable contact member 117. A conductor 120 from a suitable source extends to the arm 111 and a conductor 121 extends to a coil 122 in turn connected to line 123. A reversible motor is shown at 126 for driving a screw 127. The coil 122 actuates to close a switch 128 in the power line 129 for the motor. Another power line 130 may connect directly to the motor and a third power line is illustrated at 131.

Connected in parallel with the coil 122 are a plurality of condensers, generally illustrated at 133, this structure constituting a time delay for purposes which will presently appear and any one of which can be selected for connection in parallel with the coil 122 as by means of an adjustable contact arm 135. The stepping relay 110 is also acted upon by a coil 137 connected into a suitable circuit by lines 138 and 139 and in one of which is a clearing or reset switch 140. This reset switch is located downstream of the openings into the passageways 15 and 16 in a location such as is illustrated in Fig. 2, the switch having an actuating piece 141 to be engaged and actuated by a container. A similar stepping relay is associated with the reject finger 108 and for the purpose of avoiding needless redescription, the same reference characters are used thereon for like parts with the addition of the letter *a*.

The stepping relay actuating mechanism is diagrammatically illustrated in Fig. 7, where the arm 111 is shown as being equipped with a ratchet 150 and the coil 112 actuates a pawl 151 which functions to rock the ratchet and arm step by step clockwise. A pawl 152 holds the ratchet and arm in position against counter-clockwise reset motion. When the reset coil 137 is energized the ratchet 152 is released and the arm and its ratchet move back to a reset position. This is only one way that the reset timer may be operated and is diagrammatic only and in practice the coils 112 and 137 may be wound together in a single solenoid structure with the windings opposite each other. The stepping relay 110a may be of similar construction.

An apparatus for filling the cans is generally illustrated in Fig. 1 and comprises a main container or vat 160 for containing the substance and a loading container 161. The substance in the reservoir 160 flows into the loading container through suitable valve means 162, which may be regulated by an arm 163 operably connected as by means of a shiftable element 164 mounted upon and to be shifted by the screw 127 which is rotated by the reversible motor 126. A suitable outlet valve for loading the containers is illustrated at 165. In the operation of this arrangement, a charge or load for a container flows from the reservoir 160 into the filling container 161 and when a can or other container is under the filling container, the valve 165 is opened and the contents discharged into the can. It will thus be seen that the amount of the contents thus discharged into the can depends upon the rate of flow of the substance from the reservoir 160 into the filling container 161 and that this rate of flow is variable by the positioning of the valve 162.

The operation is as follows: Assuming that the cans are being conveyed from right to left as Fig. 1 is viewed, and that they are being filled as they pass under the filling container 161, the cans advance and their weight comes to bear upon the belts of the weighing unit. If a can is properly filled, the weighing unit is not shifted from its normal position and a container remains on the conveyor belt and shifts from right to left and in between the side portions 9a and 10a. This container is acceptable within the tolerances permitted and is then to be sealed and eventually marketed.

If a container is light, that is, if it is underfilled, its light weight is reflected at the weighing unit in this manner: The compressed air in chamber 56 rocks the weighing unit upwardly thus opening the exhaust valve 73 exhausting air from the chamber 56 until a balanced condition is attained. The pressure of the air in chamber 56 being thus lowered causes a lowering of the core 78 in coil 80 varying the current in the coil. This slight variation is suitably amplified and the current is conducted to the coil 97 which actuates the contact 94 into engagement with the contact 95. Current now passes through lines 100 and 101 to the coil 102 and the finger 103 is actuated so that it projects into the path of the pusher 6 on one side thereof. This rocks the pusher into a position as indicated at 6a and the container 3a pushed thereby moves off to one side and into the conveyor passage 16 on belt 18 and is thus rejected. At the same time, current passes through lines 113 and 114 thus energizing coil 112 and the contact element 111 of the stepping relay is moved up one notch to engage one of the contacts 115. If the next succeeding container is properly filled, its increased weight over the preceding container will rock the weighing unit until sufficient air is entered into the chamber 64 to bring the weighing unit back to normal position, causing disengagement of the contact 94 from contact 95 so that the reject finger 103 moves back to the position shown in Fig. 2, and this container will then progress straight through the conveyor. This container will engage and actuate the switch 140 which energizes coil 137 to reset the contact arm 111 of the stepping relay.

A similar action takes place if a can is overfilled. Its excess weight rocks the conveyor unit counter-clockwise as Fig. 3 is viewed to open the valve 72 and more air enters chamber 56. This raises the core 78 in coil 80 and the amplified current causes the arm 94 to engage the contact 96. This energizes coil 107 and shifts the high reject finger 108 into position to engage the pusher 6 of that container. Also, it energizes coil 112a to shift the arm 111a of the stepping relay 110a into engagement with the first one of the contacts 115a. The pusher for the heavy container is tipped to a position as illustrated at 6b (Fig. 2) and the heavy container 3b is shifted onto the belt 17 and into the heavy reject column 15. If the next container is properly filled, the weighing unit comes back to its normal position disengaging the contact member 96 and this container will move straight through the conveyor and will trip the switch 140 energizing coil 137a and reset the arm 111a of the stepping relay 110a.

If the defect is sustained, then the mechanism, through the action of the stepping relays, functions to correct defect. For example, if four light containers arrive at the weighing unit in succession, each of the four will be rejected into the light reject column 116 and in each actuation of the mechanism the stepping relay arm 111 will successively move until it engages the fourth contact of the group 115. This completes the circuit through the lines 120 and 123 to energize the coil 122 to close the switch 128 and operate the motor 126 in a direction for more widely opening the valve 162 to introduce more material into the containers. The arm 117 is shown as positioned for contact with the fourth one of the contacts in the stepping relay 110 but this can be set at any desired place. A correction thus being made, a properly filled can will progress without being rejected, will actuate the switch 140 and thus cause a resetting of the arm 111. The time delay 133 can be so regulated as to close the switch 128 after the proper time interval. Similarly, if a plurality of overfilled containers are rejected in succession, the arm 111a of the stepping relay 110 is actuated by the successive rejects and when the circuit is completed in the lines 120a and 123a the coil 122a is energizing to actuate the switch 128a to operate the motor 126 in the opposite direction to restrict the valve 162 to provide a smaller quantity of charge into the containers. Here again the arm 117a may be positioned as desired to make the correction as to the filling following a determined number of overfilled containers in sequence. In other words, one or two improperly filled containers are merely rejected, but if the defect is sustained it is corrected.

I claim:

1. An apparatus for the filling of containers with material comprising in combination, conveyor means for moving the containers in line, means at a location of the conveyor means for filling the containers, a weighing unit embodied in the conveyor downstream from the filling means including solenoid means in an electrical circuit variably influenced by light and heavy containers, a receiver at one side of the conveyor means for light containers, a receiver at the opposite side of the conveyor means for heavy containers, a reject element downstream from the weighing unit operable by variation in the electrical circuit incident to a light container for causing the light container to be shifted to the receiver therefor, and another reject element downstream from the weighing unit operable by variation in the circuit incident to a heavy container for causing the container to be shifted to the receiver therefor.

2. An apparatus for the filling of containers with material comprising in combination, conveyor means for moving the containers in line, means at a location of the conveyor means for filling the containers, a weighing unit embodied in the conveyor downstream from the filling means including solenoid means in an electrical circuit variably influenced by light and heavy containers, a receiver at one side of the conveyor means for light containers, a receiver at the opposite side of the conveyor means for heavy containers, a reject element downstream from the weighing unit operable by variation in the electrical circuit incident to a light container for causing the light container to be shifted to the receiver therefor, another reject element downstream from the weighing unit operable by variation in the circuit incident to a heavy container for causing the container to be shifted to the receiver therefor, means in the circuit operable upon successive actuations of a reject element incident to a succession of improperly filled containers for variably controlling the filling means to change the amount of material placed in the containers, and a reset switch adjacent the conveyor positioned downstream from the reject elements and engageable by a properly filled container to reset the circuit for causing cessation of the varying of the filling means.

3. In an apparatus for the filling of containers with material, the combination of conveyor means for moving the containers in line, controllable means at a location of the conveyor means for filling the containers, a weighing unit embodied in the conveyor downstream from the filling means including solenoid means in an electrical circuit variably influenced by improperly filled light and heavy containers, a receiver downstream from the weighing unit for improperly filled containers, a reject element downstream from the weighing unit operable by variations in the circuit incident to an improperly filled conveyor to condition the conveyor to shift said container to said receiver, means in the circuit operable upon the rejection of a plurality of improperly filled containers for actuating the controllable filling means to vary the quantity of material placed in the containers, and a reset switch adjacent the conveyor, downstream from the reject element and engageable by a properly filled container to recondition the circuit and cause a cessation of the actuation of the controllable filling means.

4. In combination with a conveyor for containers, means at a location of the conveyor for filling the containers including a regulating valve means for varying the quantity of material with which the containers are filled, a weighing unit embodied in the conveyor downstream from the filling means having a part movable incident to variation of weight, a receiver downstream from the weighing means for receiving improperly filled containers, an electrical circuit, a solenoid in the circuit having a part movable by the weighing unit for varying the current in the circuit, a reject element, a coil in the circuit for actuating the element incident to the improper weight of an improperly filled container to cause the said container to be shifted to said receiver, a stepping relay in the circuit, an electrical motor for operating the regulating valve, such stepping relay having a coil for actuating the same upon variations in the circuit incident to an improperly filled container, said stepping relay having selective contacts for energizing the motor to actuate the regulating valve upon a determined sequence of improperly filled containers, a reset coil for the stepping relay and a reset switch adjacent the conveyor downstream from the reject element and engageable by a properly filled container to energize the reset coil to reset the stepping relay and break the circuit for the motor.

5. The combination as set forth in claim 4, characterized in that the described reject element, and the stepping relay are sensitive to and actuated by underfilled containers, and further characterized in that there is a second reject element and a second stepping relay sensitive to and actuated by overfilled containers, and still further characterized in that the electrical motor for actuating the regulating valve is reversible.

6. An apparatus for filling containers with material comprising, in combination, conveyor means for moving the containers, means at a location of the conveyor means for filling the containers including a regulating valve, a weighing unit embodied in the container downstream from the filling means, a first reject element adjacent the conveyor and downstream from the weighing unit operable to reject underfilled containers, a second reject element downstream from the weighing unit operable to reject overfilled containers, electrical motor means for actuating the regulating valve, an electrical circuit for each reject element, means operable by movement of the weighing unit for closing the circuit for the first and second reject elements incident to underfilled and overfilled containers on the weighing unit respectively, a stepping relay in the circuit of each reject element each operable upon a predetermined number of sequential actuations of the corresponding reject element to close the electrical circuit for the motor means for actuating the regulating valve to thereby vary the amount of material placed in the containers, and a reset switch in a circuit positioned downstream from the reject elements and engageable by a properly filled container to reset the stepping relays.

7. In an apparatus for handling containers for material, the combination with a conveyor for moving containers with material therein, a weighing unit having a frame, means suspending the frame so that it may have some movement, conveying means carried by the frame and positioned in proximity to the conveyor to receive and support the containers, means carried by the frame for driving the conveying means, the conveying means being positioned laterally from the suspending means to thereby cause pivotal-like shift of the frame upon receiving underfilled and overfilled containers, a reject element downstream from the weighing unit, and means operable upon movement of the weighing unit to actuate the reject element to remove an improperly filled container from the conveyor.

8. In an apparatus for handling containers for material, the combination with a conveyor for moving containers with material therein, a weighing unit having a frame, flexible thin metal suspending means for the frame so that the frame may move with limited pivotal action, conveying means carried by the frame and positioned in proximity to the conveyor to receive and support the containers, means carried by the frame for driving the conveying means, the conveying means being positioned laterally from the suspending means to thereby cause pivotal-like shift of the frame upon receiving underfilled and overfilled containers, a reject element downstream from the weighing unit, and means operable upon movement of the weighing unit to actuate the reject element to remove an improperly filled container from the conveyor.

9. In an apparatus for handling containers for material, the combination with a conveyor for moving containers with material therein, a weighing unit having a frame, means suspending the frame so that it may have some movement, conveying means carried by the frame and positioned in proximity to the conveyor to receive and support the containers, means carried by the frame for driving the conveying means, the conveying means being positioned laterally from the suspending means to thereby cause pivotal-like shift of the frame upon receiving underfilled and overfilled containers, a reject element downstream from the weighing unit, air pressure means acting upon the frame to balance the load of the container supported by the conveying means, valve means actuated by movement of the frame incident to varying container weights to change the air pressure, and electrical means having a circuit in which the current is varied by variation of the air pressure to actuate the reject element to remove an improperly filled container from the conveyor.

10. In an apparatus for handling containers for material, the combination with a conveyor for moving containers with material therein, a weighing unit having a frame, means suspending the frame so that it may have some movement, conveying means carried by the frame and positioned in proximity to the conveyor to receive and support the containers, means carried by the frame for driving the conveying means, the conveying means being positioned laterally from the suspending means to thereby cause pivotal-like shift of the frame upon receiving underfilled and overfilled containers, a reject element downstream from the weighing unit, air pressure means acting upon the frame to balance the load of the container supported by the conveying means, valve means actuated by movement of the frame incident to varying container weights to change the air pressure, electrical means for actuating the reject element to remove an improperly filled container from the conveyor, including a solenoid in the circuit and a core therefor shiftable upon variation of the pressure of the air in said air pressure means.

11. An apparatus for use with a conveyor for containers with material therein, and movable reject means for causing removal of improperly filled containers from the conveyor comprising, a frame structure, means mounting the frame structure in a pivotal manner, conveying means carried by the frame structure to be positioned relative to the conveyor to support and move the containers, means carried by the frame for driving the conveying means, the conveying means being positioned laterally from the mounting so that the frame may shift incident to the weight of underfilled and overfilled containers, means for balancing the weight of the containers on the conveying means including, a chamber for compressed air having a flexible wall associated with the frame, the chamber having an inlet port for compressed air and an exhaust port, valve means operable by movement of the frame to open the inlet port and to open the exhaust port incident to the presence of overfilled and underfilled containers respectively on the conveying means, and means active upon variation of the pressure of the air in the chamber for actuating the reject means.

12. The apparatus as described in claim 11 characterized in that the mounting means for the frame is in the form of a thin flexible metal element.

13. An apparatus for use with a conveyor for containers with material therein, and movable reject means for causing removal of improperly filled containers from the conveyor comprising, a frame structure, means mounting the frame structure in a pivotal manner, conveying means carried by the frame structure to be positioned relative to the conveyor to support and move the containers, means carried by the frame for driving the conveying means, the conveying means being positioned laterally from the mounting so that the frame may shift incident to the weight of underfilled and overfilled containers, means for balancing the weight of the containers on the conveying means including, a chamber for compressed air having a flexible wall associated with the frame, the chamber having an inlet port for compressed air and an exhaust port, valve means operable by movement of the frame to open the inlet port and to open the exhaust port incident to the presence of overfilled and underfilled containers respectively on the conveying means, electrical means for actuating the reject means, said electrical means including a coil, a core therefor, and an expansible and contractable chamber connected to the first named chamber for shifting the core and coil relative to each other upon variation of air pressure in the first named chamber to cause actuation of the reject means.

14. An apparatus for the filling of containers with material comprising in combination, conveyor means for moving the containers, means at a location of the conveyor means for filling the containers, a weighing unit embodied in the conveyor means downstream from the filling means including solenoid means in an electrical circuit variably influenced by underfilled and overfilled containers, a receiver for underfilled containers, a receiver for overfilled containers, reject means downstream from the weighing unit operable by variation in the electrical circuit incident to an underfilled container to cause the underfilled container to be shifted to the receiver therefor, another reject means downstream from the weighing unit operable by variation in the circuit incident to an overfilled container for causing the overfilled container to be shifted to the receiver therefor.

15. An apparatus for the filling of containers with material comprising in combination, conveyor means for moving the containers, means at a location of the conveyor means for filling the containers, a weighing unit embodied in the conveyor means downstream from the filling means including solenoid means in an electrical circuit and a movable core therefor shiftable by underfilled and overfilled containers to vary the current in the circuit, receiver means downstream from the weighing unit for underfilled and overfilled containers, reject means downstream from the weighing unit operable by variation in the electrical circuit incident to the presence of underfilled and overfilled containers on the weighing unit to direct the underfilled and overfilled containers to the receiver means.

16. An apparatus for the filling of containers with material comprising in combination, conveyor means for moving the containers, means at a location of the conveyor means for filling the containers, a weighing unit embodied in the conveyor means downstream from the filling means including solenoid means in an electrical circuit variably influenced by underfilled and overfilled containers, receiver means downstream from the weighing unit for underfilled and overfilled containers, reject means downstream from the weighing unit operable by variation in the electrical circuit incident to the presence of underfilled containers on the weighing unit, for causing the underfilled and overfilled containers to be shifted to the receiver means, means in the circuit operable upon successive actuations of the reject means incident to a succession of improperly filled containers for variably controlling the filling means to change the amount of material placed in the containers, and a rest switch adjacent the conveyor positioned downstream from the reject means and engageable by a properly filled container to reset the circuit for causing cessation of the varying of the filling means.

17. In an apparatus for handling containers for material, the combination with a conveyor for moving containers with material therein, a weighing unit having a frame, means suspending the frame so that it may have some movement, conveying means carried by the frame and positioned in proximity to the conveyor to receive and support the containers, the frame of the weighing unit being movable incident to the presence of improperly filled containers on its conveying means, means for driving the conveying means, a reject element downstream from the weighing unit, and means operable upon movement of the frame of the weighing unit to actuate the reject element to remove an improperly filled container from the conveyor.

18. In an apparatus for handling containers for material, the combination with a conveyor for moving containers with material therein, means at a location of the conveyor for filling the containers, a weighing unit having a frame located downstream from the filling means, means suspending the frame so that it may have some movement, conveying means carried by the frame and positioned in proximity to the conveyor to receive and support the containers, the frame of the weighing unit being movable incident to the presence of improperly filled containers on its conveying means, means for driving the conveying means, a reject element downstream from the weighing unit, means operable upon movement of the frame of the weighing unit to actuate the reject element to remove an improperly filled container from the conveyor, means operable upon successive actuations of the reject means incident to a succession of improperly filled containers, for variably controlling the filling means to change the amount of material placed in the containers, and reset means adjacent the conveyor positioned downstream from the reject means and engageable by a properly filled container for causing cessation of the varying of the filling means.

19. In an apparatus for handling containers for material, the combination with a conveyor for moving containers with material therein, a weighing unit having a frame, means suspending the frame so that it may have some movement, conveying means carried by the frame and positioned in proximity to the conveyor to receive and support the containers, means for driving the conveying means, the frame of the weighing unit being movable incident to the support thereof of underfilled and overfilled containers, a reject element element downstream from the weighing unit, air pressure means acting upon the frame to balance the load of a container supported thereby, valve means actuated by movement of the frame incident to varying container weights to change the air pressure, and electrical means having a circuit in which the current is varied by variation of the air pressure to actuate the reject element to remove an improperly filled container from the conveyor.

20. In an apparatus for handling containers for material, the combination with a conveyor for moving containers with material therein, a weighing unit having a frame, means suspending the frame so that it may have some movement, conveying means carried by the frame and positioned in proximity to the conveyor to receive and support the containers, means for driving the conveying means, the frame of the weighing unit being movable incident to the support thereof of underfilled and overfilled containers, a reject element downstream from the weighing unit, air pressure means acting upon the frame to balance the load of a container supported thereby, valve means actuated by movement of the frame incident to varying container weights to change the air pressure, electrical means having a circuit in which the current is varied by variation of the air pressure to actuate the reject element to remove an improperly filled container from the conveyor, means in the circuit operable upon successive actuations of the reject means incident to a succession of improperly filled containers for variably controlling the filling means to change the amount of material placed in the containers, and a reset switch adjacent the conveyor downstream from the reject means and engageable by a properly filled container to reset the circuit for causing cessation of the varying of the filling means.

References Cited in the file of this patent

UNITED STATES PATENTS

| | | |
|---|---|---|
| 2,116,895 | Howard | May 10, 1938 |
| 2,323,023 | Flanagan et al. | June 29, 1943 |
| 2,503,295 | Palmer | Apr. 11, 1950 |
| 2,590,704 | Howard et al. | Mar. 25, 1952 |
| 2,623,741 | Broekhuysen | Dec. 30, 1952 |

FOREIGN PATENTS

| | | |
|---|---|---|
| 601,392 | Great Britain | May 5, 1948 |
| 601,393 | Great Britain | May 5, 1948 |